July 30, 1968     M. A. BRADBURY     3,394,922

WIRE MOUNTING CLIP

Filed June 21, 1966

Mervin A. Bradbury
*INVENTOR.*

BY *Lawrence A. O'Brien*
and *Harvey B. Jackson*
                   *Attorneys*

United States Patent Office 3,394,922
Patented July 30, 1968

3,394,922
WIRE MOUNTING CLIP
Mervin A. Bradbury, Mattoon, Ill., assignor of twenty-five percent to W. K. Kidwell, Mattoon, Ill.
Filed June 21, 1966, Ser. No. 559,257
2 Claims. (Cl. 256—57)

ABSTRACT OF THE DISCLOSURE

A clip formed of a wire-like member angularly or arcuately bent so as to form a pair of legs having a post or insulator seat defined therebetween. The extremities of the legs include offset wire-engaging portions which engage and temporarily stabilize a wire to be mounted relative to an encircled post. At last one wire-engaging portion requires a subsequent bending thereof for wrapped engagement about the wire.

---

The instant invention is concerned with the mounting of wire of all types, including fence wire, telephone wire, etc., and more particularly relates to a clip adapted to engage and clampingly mount the wire to a supporting post, insulator, or similar upright member across which the wire is to be positioned.

It is a primary object of the instant invention to provide a mounting clip which is unique in its adaptability to mount any type of wire on any post-like support structure.

In addition, it is a significant object of the instant invention to provide a mounting clip which is particularly formed so as to immediately grasp a wire upon its application and stabilize the wire relative to the supporting post until an actual locking of the wire can be effected.

In addition, it is considered an important object of the instant invention to provide a mounting clip wherein, through a simple manipulation of the clip, a positive locking engagement can be effected with both the wire and support therefor.

Also, it is an important object of the instant invention to provide a mounting clip which is adaptable for use with substantially any type of upright wire support, including fence posts, electrical insulators, etc.

In conjunction with the above object, it is also considered a significant object of the instant invention to provide a mounting clip which is similarly adaptable for use with different types and sizes of wire, in each instance effecting a positive mounting thereof.

Further, it is an object of the instant invention to provide a mounting clip which can be easily and quickly installed, and when installed constituting a positive mount for the wire.

Basically, in achieving the above objects, it is contemplated that the clip of the instant invention consist of a wire or rod-like member, preferably formed of galvanized iron or aluminum. This clip is to be angularly or arcuately bent so as to define a pair of legs having a post or insulator seat defined therebetween. The extremities of the legs are to include offset wire engaging portions which both temporarily stabilize the wire to be mounted relative to the post, and facilitate a bending of the leg ends into an encircling relationship with the wire so as to effect a positive retention and clamping thereof against the support post. One of the offset wire-engaging portions can incorporate a preformed wire-encircling spiral configuration which requires a spiral manipulation of the clip to achieve an initial mounting of the clip on the wire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
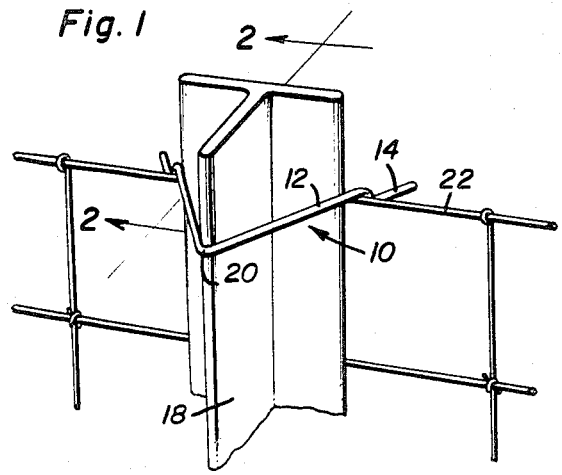
FIGURE 1 is a perspective view of the mounting clip of the instant invention utilized in mounting fence wire to a fence post with the clip illustrated prior to a final clamping thereof.
Figure 2:
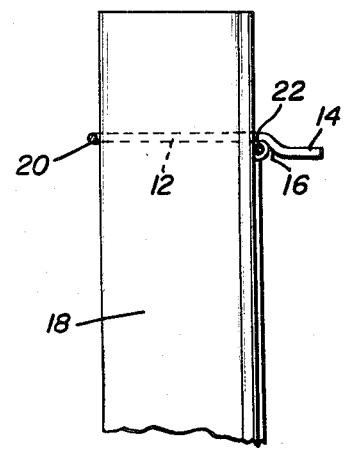
FIGURE 2 is a cross-sectional view taken substantially on a plane passing along line 2—2 in FIGURE 1.
Figure 3:
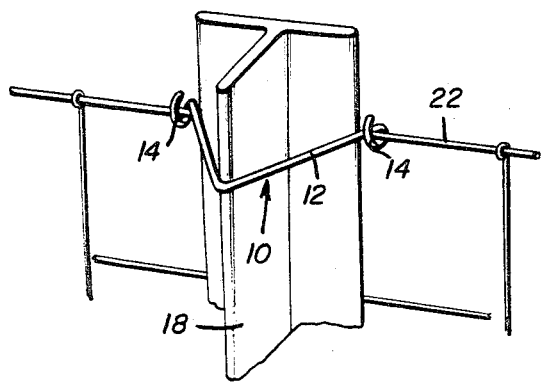
FIGURE 3 is a view similar to FIGURE 1 illustrating the clip in its clamped position.

Referring now more specifically to the drawings, reference numeral 10 is used to generally designate the mounting clip of the instant invention. This mounting clip, as will be appreciated from the drawings, consists of an elongated rod or wire-like member arcuately formed so as to define a pair of diverging legs 12. Each of these legs 12 has the outer or free end portion 14 thereof laterally offset so as to define an abutting shoulder 16 thereon. With reference to FIGURES 1 and 2 in particular, it will be noted that the diverging legs 12 define a post receiving pocket therebetween for the reception of a fence post 18, or for that matter any other suitable wire support, such as an electrical insulator. The legs 12 extend forwardly from the interconnecting or bight portion 20 of the clip to a point forward of the post 18 and engage over the wire 22 to be mounted. The offset end portions 14 are positioned over the wire 22 so as to in effect at least temporarily clamp the wire 22 between the abutment defining shoulders 16 and the front face of the post 18, thus allowing a release of the clip 10 and wire 22 so as to enable a more convenient manipulation of the pliers or other tools utilized in effecting a deformation of each of the laterally offset ends 14 to a wire encircling position as illustrated in FIGURE 3. Also of significance is the fact that the lateral offsetting of the end portions 14 facilitate the manipulation of these end portions 14 into the wire grasping position of FIGURE 3, the shoulder defining portion of the offset constituting the initial deformation of the leg end toward its wire encircling position.

Figure 4:
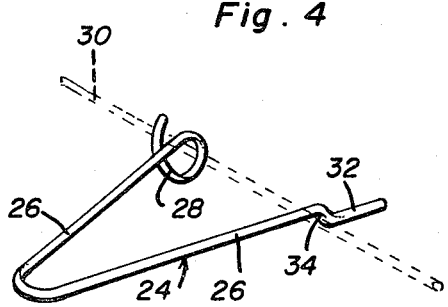
FIGURE 4 illustrates a first modified form of the clip.

Turning now to the modified clip 24 of FIGURE 4, it will be noted that this clip 24 also includes integrally connected diverging legs 26. However, one of the legs 26 terminates in an open reversely curled or spiral end portion 28 which, upon a rotational manipulation thereof, is capable of encircling the wire 30 to be mounted thereby in a manner so as to in effect encompass and lock the wire 30 therein. The outer end of the other leg 26 is, on the contrary, formed with an offset portion 32 similar to the portion 14 so as to define a wire abutment shoulder 34 which initially engages over the wire 30 in the manner of the offset portion 14 and is likewise ultimately twisted into a wire encircling relationship about the wire 30 so as to complete the mounting of the clip 24. In actually applying the clip 24, it will of course be appreciated that the curled end 28 is engaged over the wire 30 with the clip 24 then being positioned about the post against which the wire 30 is drawn, the final step involving an engagement of the offset portion 32 over the wire 30 and the locking manipulation of this offset end portion 32 about the wire 30 much in the same manner as noted supra in regard to the clip 10.

Figure 5:
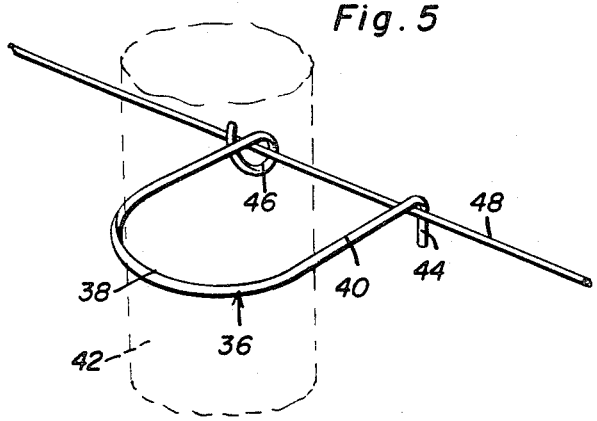
FIGURE 5 illustrates a second modified form of the mounting clip.

FIGURE 5 illustrates a further modification which is closely related to clip 24, this further modified clip 36 differing from the clip 24 in the provision of an arcuate bight portion 38 and parallel laterally spaced legs 40, thereby enabling the snug accommodation of a round supporting post 42 or the like. Another difference which will be noted with regard to the clip 36 is that the outer end portion 44 of that leg 40 which is not provided with the permanent locking loop 46, is angled perpendicularly to the leg 40 so as to define an effective temporary means for engaging the wire 48 to be mounted thereby prior to an actual manipulation of this end portion 44 into locking and clamping engagement with the wire 48. The clip 36 will be mounted in substantially the same manner as the clip 24, including a first generally spiralling engagement of the wire 48 within the reversely curved wire encircling portion 46 and a subsequent positioning of the clip about the post 42 and a snapping engagement of the end portion 44 over the wire 48 so as to effect a temporary retention of the wire 48 in position until the end portion 44 can be permanently deformed about the wire 48 in a manner which will preclude a release of the wire.

From the foregoing, it will be appreciated that a unique mounting clip has been defined in conjunction with two closely related modifications thereof. This clip is of particular significance in providing a means for positively engaging a wire with a mounting post or the like in a manner which is both rapid and simple, while at the same time providing for a positive non-loosening mounting of the wire. In addition, it is to be appreciated that a significant feature of the clip of the instant invention is the incorporation therein of means for temporarily engaging and fixing the position of the wire relative to the post through a simple engagement of the clip about the post and over the wire, this temporary engagement of the wire facilitating the ultimate manipulation of the clip into permanent locked engagement with the wire.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A preformed mounting clip for securing wires to post means or the like, said clip including a pair of spaced elongated legs, means permanently interconnecting said legs at a first end thereof and defining a post receiving pocket, said legs extending generally in the same direction and terminating in laterally spaced second ends, the portion of each leg adjacent the second end thereof being laterally deformed into a wire-engaging configuration, the second end portion of one of said legs defining a wire encircling and surrounding open spiral configuration requiring a spirally movement of this second end portion to engage about a wire, the second end portion of the second leg including a lateral offset therein defining an abutment shoulder facing the first end of the second leg.

2. The clip of claim 1 wherein the second end portion of the second leg outward of the lateral offset continues generally parallel to said second leg in a plane laterally spaced therefrom.

References Cited

UNITED STATES PATENTS

| | | | |
|---|---|---|---|
| 747,435 | 12/1903 | Jenkins | 256—57 |
| 1,207,344 | 12/1916 | Thiele | 256—57 |
| 1,510,686 | 10/1924 | Knopke | 256—57 |
| 1,848,515 | 3/1932 | Davidson | 256—57 |
| 1,868,557 | 7/1932 | Williams | 256—57 |
| 2,227,553 | 1/1941 | Paque | 256—57 |

DAVID J. WILLIAMOWSKY, *Primary Examiner.*

DENNIS L. TAYLOR, *Assistant Examiner.*